United States Patent [19]

Bennett et al.

[11] 4,445,921
[45] May 1, 1984

[54] TEMPERING GLASS SHEETS BY COOLING COMPRISING SUBLIMATION QUENCHING

[75] Inventors: Terry A. Bennett, Verona; Herbert W. Eilenfeld, Brackenridge; Dewitt W. Lampman, Gibsonia, all of Pa.

[73] Assignee: PPG Industries, Inc., Pittsburgh, Pa.

[21] Appl. No.: 460,322

[22] Filed: Jan. 24, 1983

[51] Int. Cl.³ .................................................. C03B 27/00
[52] U.S. Cl. .................................... 65/114; 65/104; 65/348; 65/351
[58] Field of Search ................... 65/114, 348, 351, 104

[56] References Cited

U.S. PATENT DOCUMENTS 3,764,403 10/1973 Neely, Jr. .................... 148/13.1
3,883,339 5/1975 Michalik et al. ................ 65/114
3,929,442 12/1975 Neely, Jr. ........................ 65/114

FOREIGN PATENT DOCUMENTS 729055 4/1969 Belgium .
2024397 11/1968 France .

Primary Examiner—Arthur D. Kellogg
Attorney, Agent, or Firm—Edward I. Mates

[57] ABSTRACT

In tempering a glass sheet to a high temper by heating the sheet to approximately its softening point followed by rapid chilling using a quenching composition that comprises a tempering medium having high heat transfer characterisitcs, the heat-softened glass sheets are protected from breakage during fabrication and resulting optical distortion by applying the tempering medium through exit orifices of a delivery system toward the heated glass in a novel cycle. The initially applied tempering medium has a low heat transfer rate and is mixed with a second tempering medium having a higher heat transfer rate to gradually increase the heat transfer rate of the mixed tempering medium. In a specific embodiment, dry air is the first tempering medium and a sublimable material, such as carbon dioxide, is the second tempering medium. The delivery system has an uninsulated portion that assures that initially the sublimable material is applied as a gas. Dry air which has a lesser heat transfer coefficient than the sublimable material in its gaseous state, may be supplied to the uninsulated portion if humidity conditions require so that dry air having a lesser heat transfer coefficient is initially directed through the exit orifices followed by mixtures of dry air with increasing concentrations of said sublimable material in the gaseous state followed by increasing concentrations of solid particles of said sublimable material. Movement of the glass sheet is coordinated with movement of the delivery system for said quenching composition to avoid "batter".

29 Claims, 3 Drawing Figures

TEMPERING GLASS SHEETS BY COOLING COMPRISING SUBLIMATION QUENCHING

BACKGROUND OF THE INVENTION

1. Field of the Invention

The present invention relates to tempering glass sheets and, more specifically, to the tempering of glass sheets using quenching materials having a high heat transfer rate, such as a sublimable material such as carbon dioxide.

2. Description of the Technical Background

The present invention relates to the tempering of glass sheets, and particularly to the tempering of relatively thick glass sheets having a thickness of ¼ inch and greater. The need to develop large tempering stresses in thick glass sheets requires the use of a quenching medium having a high capacity for heat exchange.

The present invention has utility especially for tempering glass sheets having a nominal thickness of 6 mm (¼ inch) and greater for use in laminated and monolithic windows for automobiles, railroad, aircraft and marine vehicles. However, the principles of this invention are also applicable for use in tempering glass sheets of other thicknesses and it is also understood that other material such as metals, metal alloys, plastics and glass fibers may also be chilled according to the teachings of the multiple stage cooling process of the present invention.

Glass sheets are thermally tempered by heating them to an elevated temperature above the glass strain point approaching the glass softening point, and then suddenly chilling the glass to cool the glass surface regions relatively rapidly while the inner regions of the glass cool at a slower rate. The differential cooling throughout the glass thickness develops a compressive stress in the glass surface regions which is balanced by a tension stress in the interior of the glass. The resultant tempered glass has a much greater resistance to fracture than untempered glass. Furthermore, in the less frequent occurrences when tempered glass does fracture, its breakage pattern is significantly different from that of untempered glass. Tempered glass shatters into small fragments having blunt, rounded edges. The size of these fragments is smaller and their surfaces are smoother when they develop from more highly tempered glass that is fractured. Untempered glass, on the other hand, fractures to form relatively large pieces having sharp, jagged edges. This safer breakage pattern of tempered glass and its lesser tendency to fracture makes tempered glass more desirable for use in many articles, such as transparent doors, motor vehicle closures, ophthalmic lenses, covers for instrument panels, containers, and the like.

Traditionally, glass has been thermally tempered by impinging blasts of cool air on the surface of heated glass articles. This technique is limited for practical purposes to develop compressive stress of relatively low magnitude that can be developed with air because air has limited heat transfer capacity when it impinges with a force that does not degrade the surface quality of an impinged glass sheet. When air is blasted more rapidly to improve its heat transfer qualities, the blasts or sheets of air applied against the hot glass surface cause distortion in the glass surfaces. This distortion is termed "batter" by those skilled in the art.

It is desirable to use a quenching medium that has a higher heat transfer coefficient than air. Sublimable carbon dioxide stored as a liquid under pressure has been suggested as a means of tempering hot glass sheets in U.S. Pat. No. 3,764,403 of James E. Neely, Jr. This patent discloses the application of soft particles of a sublimable solid toward the surface of a glass sheet heated to an elevated temperature sufficient for tempering on sudden chilling to chill the glass surface at a sufficiently rapid rate to impose at least a partial temper thereto. The heat of sublimation of carbon dioxide has been an important element in promoting rapid cooling that makes possible the tempering of glass sheets as thin as 1.5 mm (0.060 inch) and less. In the past, the cost of sublimable carbon dioxide has discouraged its use.

U.S. Pat. No. 3,883,339 to Edmund R. Michalik and James E. Neely, Jr., discloses a more economical way of tempering hot glass sheets by sublimation tempering using relatively expensive soft particles of sublimable material for the initial cooling either in the form of carbon dioxide snow carried by carbon dioxide gas or carbon dioxide mixed with air blasts for an initial cooling step followed by the use of air or other tempering media after the temperature throughout the thickness of the article being tempered is cooled below the strain point of the glass.

The aforesaid patent also suggests the mixing of the soft sublimable particles of carbon dioxide with air blasts so that the soft sublimable particles are applied in a cooling medium containing air blasts. This mixture not only is more economical but also moderates the rate of cooling and improves the resistance of the glass to fracture during the tempering operation.

U.S. Pat. No. 3,929,442 to James E. Neely, Jr., discloses apparatus for tempering glass sheets using a soft sublimable cooling medium such as carbon dioxide snow. This patent specifies that the apertures through which the sublimable material is applied toward the glass surface occupy less than 5% of the area of each said surface and that the exhaust paths facing the glass sheet surfaces occupy at least 50% of the areal extent of each glass sheet surface undergoing quenching.

Belgium Pat. No. 729,055 proposes heating a glass sheet to a temperature as high as 760° C. (1400° F.) followed by a multiple stage cooling technique involving first cooling the heated glass sheet by air blasts to harden the surfaces, thereby cooling them to a temperature on the order of 560° C. (1040° F.) to 640° C. (1184° F.) and developing a temperature gradient of 60° C. (108° F.) to 120° C. (216° F.) from the center to each surface of the glass sheet followed by more rapid cooling by immersion in a liquid quenching medium. This method requires heating the glass to such an elevated temperature initially that the glass is penetrated by supporting tongs so deeply as to provide poor optics in the region of the tong gripping. Furthermore, in using a liquid quenching medium, it is necessary to immerse the glass sheet incrementally into the liquid quenching medium. This enhances the likelihood of breakage because of the stress patterns that are formed because of the development in the glass sheet of a steep temperature gradient in the direction of movement into the liquid tempering medium. Furthermore, in using a liquid quenching medium, it is necessary to remove the liquid before one can use the tempered glass. The removal of quenching liquid usually involves an expensive washing and drying operation.

French Pat. No. 2,024,397 to St. Gobain discloses a glass sheet tempering apparatus in which horizontally supported glass sheets are subjected to a pair of obliquely directed elongated, opposed air blasts while moving continuously past and between a pair of elongated slots through which oblique streams of cold air are directed across the entire width of the glass sheet to reduce iridescence and to support and convey the glass sheets towards the rest of the tempering apparatus followed by exposure of the moving glass to additional blasts of air. The exclusive use of air limits the maximum temper obtainable in the glass unless the air blasts are so strong as to develop optical distortion in the major surfaces of the hot glass sheets subjected to such air blasts.

SUMMARY OF THE PRESENT INVENTION

The present invention comprises a method of tempering glass sheets that incorporates a technique that insures the application of relatively low heat capacity tempering medium to avoid establishing temporary tensile stresses that cause glass breakage for sufficient time to harden the glass surface against optical distortion resulting from the subsequent application of a tempering medium of a higher heat capacity material, such as a snow of solid particles of a sublimable material, such as carbon dioxide. These desired results are achieved in a preferred embodiment by loading a delivery system for transmitting sublimable carbon dioxide with dry air (to be used as a first tempering medium) and applying the sublimable material (to be used as a second tempering medium) from a supply source under pressure into the delivery system so as to initially cool the dry air and force it through opposed sets of exit orifices that deliver tempering medium toward the hot glass. As the dry air is delivered, the tempering medium within the delivery system gradually changes into a mixture of cold carbon dioxide gas mixed with dry air and later to carbon dioxide gas containing sublimable carbon dioxide particles. At least a portion of the delivery system that contains dry air initially is uninsulated to permit the initial onset of carbon dioxide to reach the delivery nozzles in gaseous form with sublimable particles following. As an optional feature, a pair of elongated streams of air is applied to the glass sheet after the latter leaves a heating furnace en route to the cooling station containing the exit orifices. Preferably, the onset of the delivery of sublimable particles substantially with the completion of the arrival of the glass sheet in a position of alignment between the exit orifices. Means may be provided to insure continuous relative movement between a glass sheet undergoing cooling and the exit orifices.

BRIEF DESCRIPTION OF THE DRAWINGS

In the drawings that form part of a description of an illustrative embodiment of apparatus capable of performing the present invention.

DESCRIPTION OF THE PREFERRED EMBODIMENT

Figure 1:
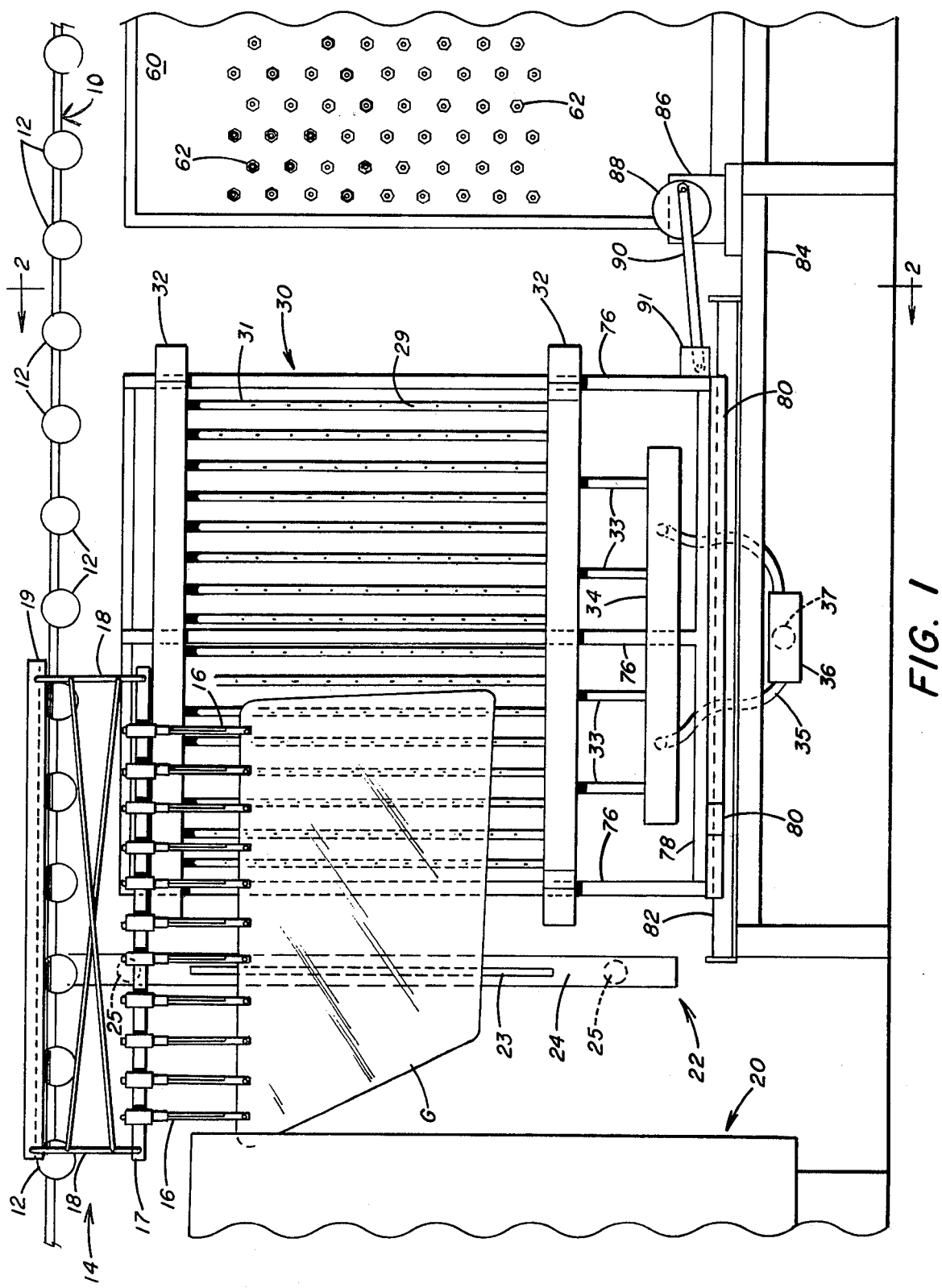
FIG. 1 is a longitudinal sectional view taken along the center line of a conveyor for conveying glass sheets through a furnace, past an optional precooling station, and a sublimation quench station followed by an after cooler, the latter being also an optional feature of the invention.

Referring to the drawings, and particularly to FIG. 1, a horizontally extending conveyor 10 is shown provided with longitudinally spaced conveyor rolls 12 extending along a path of movement for a plurality of tong support carriages 14, only one of which is shown, entering a sublimation quench station to be described later. Each tong support carriage 14 comprises a plurality of tongs 16 suspended from a tong carrying rail 17. The latter extends horizontally and is suspended by means of a plurality of curved vertical bars 18 from a carriage runner 19 which rides on the conveyor rolls 12. The latter rotate to move the tong support carriage 14 along the path defined by the conveyor 10.

The conveyor 10 extends through a tunnel-like furnace 20, only the exit end portion of which is shown, then through an optional slot air cooler 22 provided with a pair of opposed vertically extending elongated slots 23, only one of which is shown in FIG. 1, and through a sublimation quench station 30 and beyond the sublimation quench station into an optional air cooling station 80. The elongated slots 23 are in a wall of a vertically extending slotted tube 24 which receives air from upper and lower air delivery tubes 25. The slotted tubes 24 are located on opposite sides of the path taken by a glass sheet G as defined by the conveyor 10 so that air delivered through the air delivery tubes 25 to the slotted tubes 24 is directed toward the opposite surfaces of a glass sheet moving between the slots 23.

The sublimation quench station 30 comprises a plurality of quenching medium delivery tubes 31 that extend vertically between upper and lower horizontally extending distribution manifolds 32. Each of the vertically extending, quenching medium delivery tubes 31 is provided with a series of spaced exit orifices 29. The exit orifices 29 of the vertical quench tubes 31 are arranged along diagonal lines in vertical planes flanking a vertical plane that intersects the path of movement taken by glass sheets between a pair of opposed sets of vertically extending, quenching medium delivery tubes 31.

The distribution manifolds 32 comprise an upper distribution manifold and a lower distribution manifold for each set of quenching medium delivery tubes 31. The lower distribution manifold 32 is connected to a plurality of upwardly directed delivery pipes 33 which extend from a common distribution manifold 34. The latter are connected to flexible feed lines 35. The latter, in turn, are connected at each side via a T-connection 36 (see FIG. 3) to one of a pair of uninsulated feed pipes 37. The feed pipes extend for a distance of approximately 20 feet (8 meters) for a reason to be described later.

Figure 3:
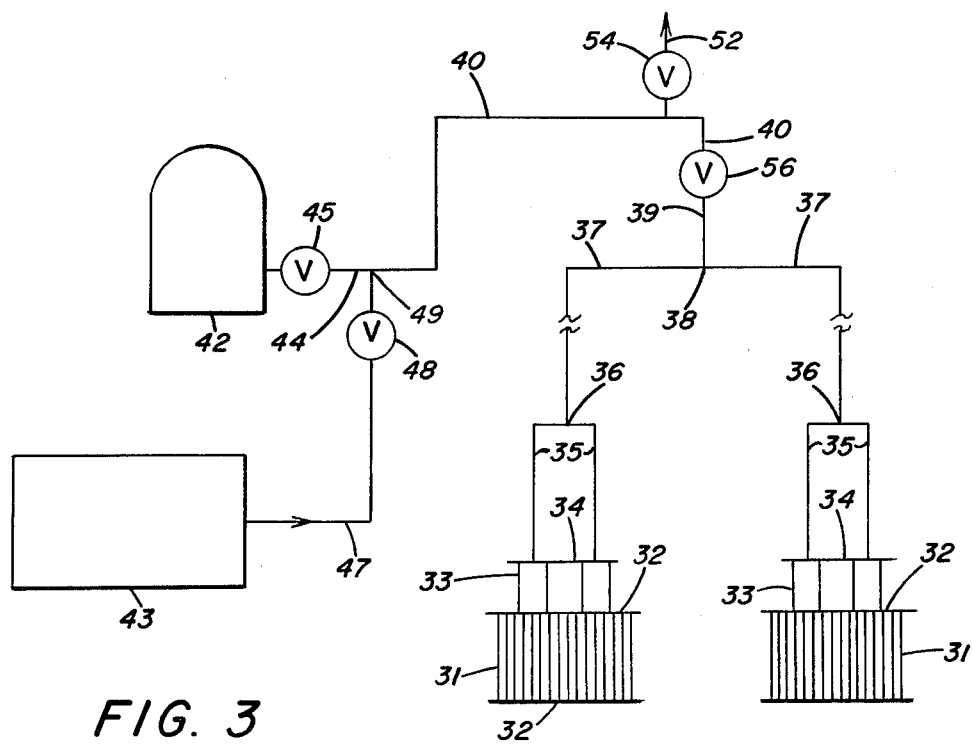
FIG. 3 is a schematic diagram of the various feedlines for the delivery system to supply tempering medium to a sublimation quench station of the tempering apparatus conforming to an illustrative embodiment of the present invention.

Referring to FIG. 3, the exposed feed pipes 37 extend from a main T-connection 38 which communicates a main feed line 39 to each of the exposed feed pipes 37.

The main feed line 39 comprises an insulated main feed line portion 40 upstream of an uninsulated portion immediately upstream of main T-connection 38. A valved storage tank 42 stores cold compressed liquid carbon dioxide under pressure of 300 pounds per square inch (20.5 atmospheres). A source of dry compressed air 43 is operated to deliver air under a pressure of 35 pounds per square inch (2.3 atmospheres). An insulated carbon dioxide branch supply line 44 communicates from the carbon dioxide storage tank 42 to the main insulated feed line portion 40 and is provided with a main carbon dioxide valve 45. The pressurized dry air source 43 communicates with a branch air supply line 47 which contains a main air valve 48 and is also insulated. Downstream of the flow of carbon dioxide and compressed air beyond the main carbon dioxide valve 45 and downstream of the main air valve 48, the main carbon dioxide supply line 44 and the main air supply line 47 are joined at an air, carbon dioxide tee connection 49 to form the main insulated feed line portion 40. The latter feeds a mixture of air and carbon dioxide or either component past a vent pipe 52 provided with a vent valve 54 and is connected to the uninsulated portion of the main feed line 39 beyond a secondary feed valve 56.

The optional air cooler 60 is located further along the path of movement provided by the conveyor 10 beyond the sublimation quench station 30 and is provided with a plurality of nozzles 62 arranged in an oblique array to permit further cooling by air of the tempered glass that has been previously quenched in the sublimation quench station 30.

Figure 2:
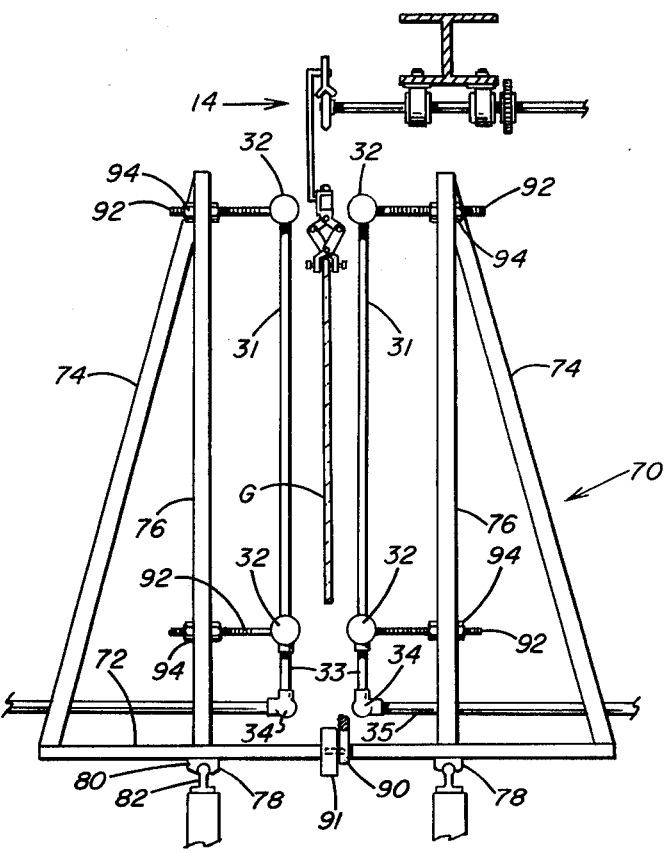
FIG. 2 is a transverse sectional vertical view taken beyond the quenching station along the line 2—2 of FIG. 1.

In order to avoid developing irisdescent patterns in the glass, the quenching medium delivery tubes 31 of the delivery systems for the sublimation quenching station 30 are supported for reciprocating movement with an open frame 70. The frame comprises a plurality of transverse horizontal tie rods 72 and oblique rods 74 as is seen in FIG. 2, supplemented by FIG. 1. A plurality of vertical rods 76 are connected with the oblique rods 74 to form the open frame 70. Horizontal linear rods 78 supporting sleeves 80 ride on parallel, track means 82 to permit the open frame 70 to move linearally along the track means 82.

The track means 82 are mounted on a mounting base 84 which also supports a drive motor 86. The latter is operatively coupled to an eccentric cam 88 which operates an eccentric link 90. The latter is operatively connected to one of the transverse tie rods 72 to permit the entire open frame 70 to reciprocate linearly along the track like shafts 82 when driven by the drive motor 86.

Each of the distribution manifolds 32 has spaced, externally threaded rods 92 extending outwardly therefrom transversely of the length of the sublimation quenching station 30. The outer ends of the externally threaded rods 92 are received in apertures extending through the vertical rods 76 and suitable lock nuts 94 are provided on opposite sides of each of the vertical rods 76 to secure the upper and lower distribution manifolds 32 in spaced relation to the open supporting frame. The flexible feed lines 35 compensate for reciprocating movement of the open frame 70.

According to an alternate feature of inventive subject matter incorporated in this specification, the frame 70 is stationary while the glass sheet enters the cooling station. The cam 88 rests in an extreme downstream position to await the arrival of a glass sheet into its quenching position. When the glass sheet, suspended from tongs 16 supported from a tong support carriage 14, approaches its proper quenching position of alignment between the opposing sets of vertical quenching medium delivery tubes 31, a position counter decelerates carriage 14 to a stop and simultaneously starts the drive motor 86 to move the link 90 in an initial upstream direction as the glass sheet stops its downstream movement to continue relative reciprocation between the exit orifices 29 relative to the opposite major surfaces of the glass sheet suspended for quenching after the glass sheet stops in a quenching position between opposed sets of exit orifices 29. This continuation of relative motion avoids establishing iridescent patterns and/or the surface damage termed batter during both the entry of the glass sheet into the cooling station and its presence at the quenching position.

The position counter can be any well known multiple timing device available for controlling the cycle of multiple step glass sheet processing operations. A glass sheet temperature monitoring device within the furnace initiates the timed sequence of the opening of a furnace exit door, the cycle of rotation of the conveyor rolls 12, and the timing of the opening and closing of the various valves 45, 48, 54 and 56 of the tempering medium delivery system as well as additional valves that supply air to the optional slot cooler 72 and the optional air cooler 60, should the optional coolers be incorporated in the apparatus.

A lengthy experimental program was needed to develop optimum parameters for producing thick tempered glass sheets for use as impact resistant plies for laminated panels for commercial aircraft. The sheet required a compression stress in excess of 40,000 psi (2810 Kg/cm$^2$) and good optical properties in sheets $\frac{5}{8}$ inch (16 millimeters) thick.

EVALUATION OF QUENCH TO GLASS SPACING EFFECTS

During initial trials to evaluate quench design parameters, the quench to glass spacing was investigated to determine its effect on temper level, surface quality and breakage. For this trial a series of rectangular sheets $\frac{1}{2}$ inch (1.27 cm) thick was heated to 1270° F. (688° C.) and tempered with soft sublimable particles of $CO_2$ at varying quench to glass spacings. The temper level results obtained follow in Table I.

TABLE 1

| Effect of Quench to Glass Spacing on Temper Level | |
|---|---|
| SPACING (Glass to Quench) | TEMPER LEVEL |
| 6½ inches (165 mm) | 33,000 psi (2320 Kg/cm$^2$) |
| 5 inches (127 mm) | 43,000 psi (3020 Kg/cm$^2$) |
| *4⅜ inches (113 mm) | 45,000 psi (3160 Kg/cm$^2$) |

*minimum allowable due to equipment configuration.

The obvious conclusion from these tests is that the temper level increases with decreasing glass to quench spacing. This was due to the increase in heat transfer level which resulted from the higher velocity of the impinging quenching medium applied from quenches located at closer spacings to the glass.

Two other effects noticed from the closer glass to quench spacing are that the surface batter from the higher velocity jets was significantly and objectionably increased, and the glass breakage resulting from the more severe cooling resulting from closer glass to quench spacing was also increased.

This increase in quench breakage was attributed to the higher heat transfer level which also has several effects. First, closer glass to quench spacing increases the temporary tensile stresses in the glass surface at the onset of quenching to a level near the tensile stress limit that soda lime glass can withstand. These high temporary tensile stresses tend to induce breakage. Secondly, to overcome the breakage problem, the temperature of the glass at the furnace exit has to be increased to improve the probability of the glass surviving the chance for breakage. Thirdly, the higher glass temperature needed to increase the chance of glass sheet survival during quenching may result in surface damage from impacting a softer glass surface with higher velocity solids directed from quench delivery sources closer to the heat-softened glass sheet. The higher glass temperatures are associated with softer glass sheet surfaces.

From analysis of surface damage and resulting compression stresses obtained using exit orifices of various diameters, the optimum quench to glass spacing was determined to be 6 inches (15 cm). From this analysis, the efficiency of this spacing to develop sufficiently high temper level with very low breakage and surface damage was attributed to the fact that the cones of solids issuing as jets from the exit orifices provided a uniform velocity field when the adjacent jet cones just touched, thereby providing a uniform heat transfer field to the glass, with an intensity of approximately 115 British thermal units per hour square foot per degree Fahrenheit (0.016 calories per second per square centimeter per degree Celsius). This heat transfer level is sufficient to produce the desired temper level without the use of extremely high velocity solids. A higher velocity jet impact at a glass surface closer to the orifice tube would thereby produce a heat transfer field of greater non-uniformity, because the cones of adjacent jets would impinge on discrete areas of the quenched glass sheet surfaces. Also, if the spacing between adjacent exit orifices were decreased to provide greater orifice density that results in a more uniform field of heat transfer at the glass surfaces, the amount of liquid $CO_2$ required would dramatically increase, and the overall heat transfer level developed would become so high that breakage would inevitably result with greater frequency.

EVALUATION OF QUENCH ORIFICE DIAMETER EFFECTS

During the production quench development program, three orifice diameters were evaluated at a quench to glass spacing of 6 inches (15.24 cm). These were 60 mils (1.52 mm), 70 mils (1.78 mm) and 80 mils (2.03 mm). For this quench to glass spacing the 70 mils (1.78 mm) diameter was determined to be the optimum diameter for the exit orifices 29.

The 60 mils (1.52 mm) diameter exit orifices required higher velocity jets than 70 mils (1.78 mm) diameter exit orifices to produce the required heat transfer level. To develop uniformity in the heat transfer field, i.e. jet cones touching, a closer spacing array of 60 mils diameter exit orifices is required than for the optimum spacing array developed for 70 mils diameter exit orifices. Using exit orifices of 60 mils diameter increases the $CO_2$ mass flow rate compared to that required for 70 mils (1.78 mm) diameter exit orifices. The higher velocity jets of the 60 mils (1.52 mm) diameter exit orifices caused objectionable surface damage when producing the required heat transfer and glass temper levels.

The quench apparatus provided with exit orifices having diameters of 80 mils (2.03 mm) produced higher mass flow rates and heat transfer levels than that resulting from the same array of 70 mils diameter exit orifices. As a result, the geometry of jets of quenching medium from the 80 mils diameter orifices were more nearly cylindrical and had less forward velocity than the jets from the 70 mils diameter exit orifices. Consequently, the jets of quenching medium overlapped at the glass surfaces, thereby producing a non-uniform heat transfer pattern with increased differences due to a higher heat transfer level in each glass sheet surface region directly facing each exit orifice. Glass breakage was caused by the greater non-uniformity in heat transfer levels, which caused tensile stresses greater than those required to produce sufficient temper levels in the tempered glass sheets with apparatus containing 70 mils diameter exit orifices.

The 70 mils diameter exit orifices were therefore selected in combination with a 6 inch (15.24 cm) quench to glass spacing due to their ability to produce a uniform heat transfer field sufficiently high to produce the required temper level in glass sheets previously heated to a required glass temperature without causing unacceptable levels of glass surface damage from impingement of jets of quenching medium.

QUENCH-ORIFICE SPACING DETERMINATION AND RECIPROCATION ANALYSIS

The quench apparatus developed for commercial use had the exit orifices 29 arranged in an array comprising three inches (7.6 cm) of horizontal spacing between centers of adjacent quenching medium delivery tubes 31 and three inches center to center spacing vertically between exit orifices 29 along each delivery tube 31. The quenching apparatus incorporated the optimum 70 mils diameter exit orifices. The delivery tubes 31 of the quenching apparatus were spaced 6 inches (15.24 cm) from the adjacent glass surface. The quenching apparatus was provided with means to reciprocate in a horizontal direction over a 6 inch (15.24 cm) displacement.

The exit orifices 29 of adjacent quenching medium delivery tubes 31 were drilled along lines skewed 18°43' to the horizontal direction of glass sheet travel and quenching apparatus reciprocation. This means that the distance between horizontal reciprocation paths of vertically adjacent exit orifices 29 was one inch (2.54 cm). The corresponding center to center distance between adjacent exit orifices on the same horizontal plane was 9 inches (22.86 cm). Therefore, a 6 inch (15.24 cm) horizontal reciprocation of the quench apparatus developed a 3 inch (7.62 cm) space between the ends of the reciprocation paths of horizontally adjacent exit orifices. This means that the end of a reciprocation path for a given exit orifice was near the mid-way location of the horizontal reciprocation path for a horizontally aligned exit orifice taken from a delivery tube two tubes away from the given exit orifice.

EVALUATION OF SLOT AIR COOLER PARAMETERS

In order to provide the capability for more uniform surface cooling of the heated glass sheet during its movement from the furnace to the sublimation quench station, an air slot cooler system was introduced to the system. Each slot air cooler 22, one on each side of the plane of glass travel, consisted of a ⅛ inch (3.2 mm) wide slot in a vertically extending tube 24 of rectangular cross-section which was fed through air delivery tubes 25 near its top and bottom with air from a small blower (not shown).

In order to vary the heat transfer level of this slot over its range of from 0 to 70 British thermal units per hour per square foot per degree Fahrenheit (0.009 calories per second per square centimeter per degree Celsius) the mass flow rate of air from the slot was varied by regulating the supply blower output. Therefore, the other slot cooler variable affecting heat transfer level, the slot to glass spacing, was held constant at 2.5 inches (6.35 cm) from glass surface to slot cooler.

These slot coolers were operated at approximately 65 British thermal units per hour per square foot per degree Fahrenheit, (0.009 calories per second per square centimeter per degree Celsius) to chill the glass surface just prior to the impact of the $CO_2$ gas and solids at the quench station. These slot coolers contributed to the reduction of $CO_2$ surface damage in the processed glass while only reducing the final temper level by approximately 4 to 5 percent.

The slot coolers reduced the glass surface temperature by approximately 40° F. (22° C.) from the furnace exit position to a point just prior to entering the sublimation quench when operated at maximum adjusted air flow.

Following is Table II depicting sublimation tempering results for ⅝ inch (16 cm) thickness float glass using the preferred quench with 70 mils diameter exit orifices for the same glass exit temperature of 1280° F. (693° C.). The three test conditions were Condition 1: cooling with strong air streams directed through the slot coolers as the glass sheet moved from the furnace exit to the quench station followed by applying $CO_2$ gas, and then $CO_2$ solids at the quenching station. Condition 2: cooling with air applied at a lesser strength through the slot coolers to develop a reduced slot cooler heat transfer level and then cooling at the quench station for a shorter duration with $CO_2$ gas followed by $CO_2$ solids. Finally, Condition 3: no surface cooling with air directed through the slot cooler or $CO_2$ gas applied at the quench station, just solid $CO_2$ particles. A corresponding decrease in optical surface quality resulted from the reduction and elimination of cooling prior to applying the solid $CO_2$ particles.

TABLE II

| Effect of Slot Cooling on Resulting Glass Temper Level | |
|---|---|
| Test Conditions | Mean Temper Level |
| 1. | 45,000 psi (3160 Kg/cm$^2$) |
| 2. | 47,100 psi (3310 Kg/cm$^2$) |
| 3. | 50,800 psi (3570 Kg/cm$^2$) |

GLASS EXIT TEMPERATURE DETERMINATION FOR ⅝ INCH (16 MM) THICK GLASS

In order to maintain the best optical surface quality possible during processing of ⅝ inch (16 mm) thickness aircraft parts, the glass surface temperature attained at the furnace exit was held as low as possible while avoiding breakage due to temporary tensile stresses developed by cooling at the heat transfer level developed by the quenching medium used with the quenching apparatus tested.

For this purpose a heating cycle was used in the heating furnace 20 to heat the glass sheet to provide balanced thermal gradients from each major surface to the center of the glass thickness. However, a gradient in glass surface temperature was intentionally produced to increase the glass temperature in a downward direction from the tong gripping area near the top edge of the treated glass sheet toward the central portion of the glass sheet. This serves to reduce tong penetration and elongation which severely reduces the optical quality of the finished product.

Thermocouple measurements of glass surface temperatures during heating cycles displayed an average difference in temperature between the tong gripped portions and central portions of the glass sheets of 27° F. (15° C.) using the final heat cycle. That is, the tong gripping area 3 inches (7.62 cm) below the upper edge in the center of the heated sheet reached an average temperature of 1290° F. (699° C.), while an average reading from front to back to 1317° F. (714° C.) was observed in the exact center of the sheets on leaving the furnace 20.

These glass surface temperatures, while higher than those required for tempering using air blasts, were necessitated by the higher heat transfer level of the sublimable quenching medium needed for the higher stresses required for the production units fabricated. This is because as the heat transfer coefficient of a quenching medium increases, the temperature required at the furnace exit to avoid fracture from temporary tensile stresses in the glass surface during the onset of quenching also increases. Once the glass surface temperature has reached a required elevated temperature for a given heat transfer level, breakage is essentially eliminated and further increases in exit temperature provide only marginal increases in temper level but increasing surface damage to the glass at any given strength of application of quenching medium.

EXAMPLE

The most efficient and effective quench employing the best embodiment of quenching apparatus under commercial production conditions included exit orifices 29 for delivery tubes 31 having 70 mils (1.78 mm) diameter. The quenching medium delivery tubes 31 were capable of being spaced from the glass by a distance up to 7 inches (178 mm). The quenches reciprocated horizontally at a displacement of 6 inches (15.24 cm) and the exit orifices 29 were distributed in arrays on vertical quench tubes 31 separated by 3 inch (7.62 cm) centers. The exit orifices 29 were arranged in oblique rows from quench tube to quench tube skewed 18°43' to the direction of travel of the glass. The orifice array during reciprocation defined reciprocating paths 6 inches (15 cm) long separated 1 inch (2.5 cm) vertically and 3 inches (7.6 cm) horizontally. The quench included apertured quench tubes 31 of ⅜ inch diameter (9.5 mm) and upper and lower distribution manifolds 32 having 1½ inch (3.81 cm) diameters. The slot cooler 22 comprised opposed rectangular elongated tubes 60 inches (152 cm) long each having a ⅛ inch (3.2 mm) wide slot, 36 inches (0.9 meter) long facing the path of glass sheet movement from opposite sides thereof, horizontally spaced 2.5 inches (6.35 cm) from the path of glass sheet movement and included upper and lower delivery tubes 25.

Dry air delivered from a dry air source 43 at 35 pounds per square inch (2.46 Kg/cm$^2$) developed a pressure of about 0.5 pounds per square inch (0.035 Kg/cm$^2$) in the lower distribution manifolds 32 through lines 47, 40, 39, 37 and 35. Carbon dioxide delivered from a storage tank 42 maintained at a pressure of 300 pounds per square inch (21 Kg/cm$^2$) at a temperature of $-15°$ F. ($-26°$ C.) developed a pressure in the lower distribution manifolds 32 in the range of 150 to 160 pounds per square inch (1.07 to 1.14 Kg/cm$^2$) through the delivery system lines 44, 40, 39, 37 and 35 with the quenching medium delivery tubes 31 separated by 12⅝ inches (32.07 centimeters).

In the beginning of the tempering cycle, a glass sheet ⅝ inch (16 millimeter) thick supported from tongs 16 suspended from carriage 14 was heated in a tunnel like furnace until the glass temperature read 690° C. (1274° F.) at its center portion and 665° C. (1229° F.) at its tong gripping portion. The hot glass sheet passed between the elongated slotted tubes 24 at a tube to glass distance of 2.5 inches (6.35 cm). Air at a pressure equivalent to 1 inch (2.54 cm) of water column was directed against the moving glass sheet through slots 23.

During the heating time, the main carbon dioxide valve 45 was closed, the secondary feed valve 56 was opened, the vent valve 54 was closed and the dry air valve 48 was opened. This enabled the portion of the quenching medium delivery system comprising the main feed line 39, the insulated main feed portion 40 and the rest of the main feed line 39 to be filled with dry air. When the glass sheet started to leave the furnace 20, the secondary feed valve 56, the vent valve 54, and the dry air valve 48 were closed. Then, the main carbon dioxide valve 45 was opened to insure the initiation of carbon dioxide flow into the system to purge the dry air from the quenching medium delivery system and through the exit orifices 29 onto the glass sheet moving toward the desired quenching position. The optional slot cooler 22 was actuated to blow a pair of blasts of air across the path of movement taken by the glass sheet from the optional slot air cooler 22 as the glass sheet suspended from the carriage 14 left the furnace 20.

As the carriage 14 began moving, it started a position counter (not shown) which determined when the secondary carbon dioxide valve 56 opened in relation to the position of the moving carriage relative to a desired quenching position at the quench station 30. The set point on this counter determined how long the carbon dioxide gas impinged on the glass surface before the solids began their impingement. With this set point adjustment technique, the duration of the impingement of carbon dioxide gas was adjustable from 0 to approximately 3 seconds. The set point timing was set in such a manner that as the glass stopped in its desired quenching position, the solid soft particles were just beginning to flow through the exit orifices 29. The duration of carbon dioxide application was controlled by a timer triggered by the counter. A 30 second setting was suitable for production purposes to produce an adequate temper of more than 40,000 psi (2810 Kg/cm$^2$) in glass sheets $\frac{5}{8}$ inch (16 mm) thick.

The length of the exposed feed pipes 37, which are not insulated, was approximately 20 feet. This enabled the initial carbon dioxide released from the CO$_2$ storage tank 42 to heat up to the gaseous state and the initial flow of gaseous carbon dioxide mixed with the dry air previously supplied to the quench delivery system and chilled the latter.

Initially, some of the dry air was purged through the exit oirfices 29 to harden the glass sheet surfaces as the glass sheet approached the desired quenching position in the quenching station 30. As the dry air purge continued, the gaseous carbon dioxide mixed with some of the dry air remaining in the quench delivery system to form a mixture that gradually increased in gaseous carbon dioxide cencentration. Further cooling of the system caused additional subsequent carbon dioxide to be delivered in increasing concentrations of soft, solid, cold sublimable particles.

Since the glass sheet is initially quenched with cold tempering medium comprising blasts of air having a low heat transfer coefficient below about 0.009 calories/-second-square centimeter-degree Celsius (70 B.T.U./-hour-square foot-degree Fahrenheit) before the onset of exposure to cold tempering medium having increasing heat transfer coefficients to a maximum in the vicinity of about 115 BTU/hour-square foot-degree Fahrenheit (0.016 calories/second-square centimeter-degree Celsius) that resulted from applying cold, soft, solid, sublimable particles of carbon dioxide, the glass surfaces were hardened sufficiently initially to resist surface deformation while glass sheets useful as thick structural plies $\frac{5}{8}$ inch (16 mm) thick developed surface compression stresses as high as 46,000 pounds per square inch (3170 kilograms per square centimeter) when subjected to the treatment described. A typical outline of an aircraft panel is shown in FIG. 1.

The glass sheet, after 30 seconds of exposure to cold, soft, solid, sublimable particles of carbon dioxide, was transferred to an additional cooling station 60 where the glass was subjected to additional air blasts from opposing arrays of nozzles 62. The arrays of nozzles in cooling station 60 were arranged in oblique rows 1.5 inches (3.8 cm) apart from row to row and 1.5 inches (3.8 cm) apart along each row. The rows were skewed approximately 27 degrees from the horizontal path of travel for the glass sheet through the cooling station 60. The nozzle to glass distance was approximately 3 inches (7.6 cm). The air cooling subsequent to each quench cooling provides a more economical operation than complete cooling to handling temperature by a quench cooling with solid, sublimable particles throughout the cooling cycle, as set forth in U.S. Pat. No. 3,883,339 to Michalik and Neely.

At the end of a quenching cycle, the system was purged of carbon dioxide by closing the main CO$_2$ valve 45 and opening vent valve 52 while main air valve 48 and secondary feed valve 56 were closed. The main air valve 48 and secondary feed valve 56 were opened after the residual CO$_2$ pressure in the system dissipated.

The quench delivery system was prepared for another quenching operation prior to the next quenching cycle by maintaining the main CO$_2$ valve 45 together with the manual valve for the CO$_2$ storage tank 42 and the vent valve 54 closed, and the main air valve 48 and secondary feed valve 56 open to purge any residual carbon dioxide from the delivery system. When the delivery system downstream of main CO$_2$ valve 45 contained dry air, main air valve 48 and secondary feed valve 56 were closed. The system was then ready for another operation.

The form of the invention shown and described in this disclosure represents an illustrative preferred embodiment and certain modifications thereof. It is understood that various changes such as omitting the need for dry air purging when the apparatus is located in a low humidity environment, for example, may be made without departing from the gist of the invention as defined in the claimed subject matter which follows.

We claim:

1. A method of tempering a glass sheet comprising heating said sheet to an elevated temperature range sufficient for tempering and rapidly cooling said glass sheet from said elevated temperature range by directing a first tempering medium at a temperature significantly below said elevated temperature range at the opposite major surfaces of said glass sheet, said tempering medium having an initial heat transfer capacity sufficient to cool said major surfaces at a rate such that said sheet develops a maximum temporary tensile stress insufficient to cause said glass sheet to fracture and gradually changing the composition of said cold tempering medium by mixing a second tempering medium at a temperature significantly below that of said glass sheet and having a greater heat transfer capacity than said initial heat transfer capacity in such a manner as to increase gradually the heat transfer capacity of the resulting mixture of cold tempering media directed toward said opposite major surfaces.

2. A method as in claim 1, wherein said first tempering medium initially directed at said major surfaces contains air as an essential ingredient.

3. A method as in claim 2, wherein said second tempering medium contains a sublimable composition as an essential ingredient.

4. A method as in claim 3, wherein said second tempering medium contains carbon dioxide as an essential ingredient.

5. A method as in claim 1, further including moving said glass sheet in a single direction while heated to said elevated temperature range through a pair of opposed, slot shaped blasts of cool air extending transversely across the entire major surface of said glass sheet prior to exposing said glass sheet to said tempering media of gradually increasing heat transfer capacity.

6. A method as in claim 5, further including moving said glass sheet past said slot shpaed blasts in said single direction into a quenching position in alignment between opposed sets of exit orifices while the latter are stationary, and as said glass sheet comes to a stop at said quenching position, starting to reciprocate said exit orifices with an initial displacement in a direction opposite said single direction and continuing to reciprocate said exit orifices while applying said tempering medium toward said stationary glass sheet to insure continuous relative motion between said exit orifices and said glass sheet during application of said tempering medium.

7. A method as in claim 2, further including supplying dry air to a delivery system having an uninsulated portion and opposed sets of exit orifices initially supplying said dry air through said exit orifices toward a glass sheet at said quenching position by purging said dry air from said uninsulated portion with gaseous carbon dioxide to deliver said dry air through said exit orifices toward the opposite surfaces of said glass sheet as the latter moves toward said quenching position, gradually replacing said purged dry air with gaseous carbon dioxide in said uninsulated portion to deliver a mixture of air and gaseous carbon dioxide of gradually increasing concentration of carbon dioxide toward said glass sheet and gradually replacing at least a portion of said gaseous carbon dioxide with cold, soft, sublimable solid particles of carbon dioxide approximately at the same time as said glass sheet reaches said quenching position to deliver a mixture of gaseous carbon dioxide and soft, solid, sublimable particles of carbon dioxide increasing in concentration of soft, solid, sublimable particles with time to produce a tempered glass sheet having acceptable optical properties and a high thermal temper.

8. A method as in claim 7, wherein the glass sheet stops in said quenching position at approximately the same time as said delivery system begins to deliver said soft, solid, sublimable particles.

9. A method as in claim 7, wherein the exit orifices are reciprocated along a path of reciprocation parallel to said path of glass sheet travel into said quenching position.

10. A method as in claim 9, including holding said exit orifices stationary as said glass sheet moves toward said quenching position, moving said exit orifices in a direction opposite the direction of glass sheet movement into said quenching position when said glass sheet arrives at said quenching position and continuing to move said exit orifices in a linear reciprocating path after said glass sheet stops at said quenching position to insure continuous relative motion between said exit orifices and said glass sheet during application of said tempering medium.

11. A method of tempering a glass sheet comprising heating said glass sheet to an elevated temperature range sufficient for tempering and rapidly cooling the heated glass sheet by exposing the glass sheet to cold, soft, solid particles of a cold sublimable material delivered through exit orifices of a tempering medium delivery system, characterized by first delivering said cold, sublimable material to the opposite major surfaces of said glass sheet from storage container means storing said cold sublimable material in liquid form under pressure through a delivery system comprising exit orifices via an uninsulated portion of sufficient length to convert the initial portion of said sublimable material to gas before its arrival in the vicinity of the major surfaces of said glass sheet from said exit orifices of said delivery system and the subsequent portion of said sublimable material in the form of soft, solid particles, whereby the glass sheet is initially subjected to tempering medium of relatively small heat capacity and subsequently to soft, solid particles of sublimable material having relatively large heat capacity to initially harden the glass sheet surface sufficiently to withstand said subsequent impingement of said soft, solid particles of said sublimable material and develop a high temper in said glass sheet without developing substantial surface damage that impairs the optical properties of the tempered glass sheet.

12. A method as in claim 11, wherein said glass sheet is subjected to tempering medium having heat capacity more than said initial small heat capacity and less than said subsequent large heat capacity during the interval between the initial application of tempering medium of relatively small heat capacity and the subsequent application of soft, solid particles of sublimable material having relatively large heat capacity.

13. A method as in claim 12, comprising delivering said sublimable material through a pair of opposite sets of exit orifices in the form of gas for 2 to 5 seconds toward said hot glass sheet prior to the onset of delivery of said soft, solid particles.

14. A method as in claim 11, further characterized by applying dry air to said delivery system to prepare said system for quenching and purging said dry air from said delivery system through said exit orifices during the initial stage of said quenching cycle by delivering said cold sublimable material into said delivery system when the humidity of the environment in which said quenching takes place is sufficiently high to cause moisture to condense and freeze in said delivery system.

15. A method as in claim 11, further including moving said glass sheet in a single direction while heated to said elevated temperature range through a pair of opposed, slot shaped blasts of cool air extending transversely across the entire major surface of said glass sheet prior to exposing said glass sheet to said exit orifices of said delivery system.

16. A method as in claim 15, further including moving said glass sheet past said slot shaped blasts in said single direction into a quenching position in alignment between said exit orifices while the latter are stationary, and as said glass sheet comes to a stop at said quenching position, starting to reciprocate said exit orifices with an initial displacement in a direction opposite said single direction and continuing to reciprocate said exit orifices while applying said tempering medium toward said stationary glass sheet to insure continuous relative motion between said exit orifices and said glass sheet during application of said tempering medium.

17. A method as in claim 12, further including initially supplying dry air to a delivery system having an uninsulated portion and opposed sets of exit orifices, initially supplying said dry air through said exit orifices toward a glass sheet at said quenching position by purging said dry air from said uninsulated portion with gaseous carbon dioxide to deliver said dry air through said exit orifices toward the opposite surfaces of said glass sheet as the latter moves toward said quenching position, gradually replacing said purged dry air with gaseous carbon dioxide in said uninsulated portion to deliver a mixture of air and gaseous carbon dioxide of gradually increasing concentration of carbon dioxide toward said glass sheet and gradually replacing at least a portion of said gaseous carbon dioxide with cold, soft, sublimable solid particles of carbon dioxide approximately at the same time as said glass sheet reaches said quenching position to deliver a mixture of gaseous carbon dioxide and soft, solid, sublimable particles of carbon dioxide increasing in concentration of soft, solid, sublimable particles with time to produce a tempered glass sheet having acceptable optical properties and a high thermal temper.

18. A method as in claim 17, wherein the glass sheet stops in said quenching position at approximately the same time as said delivery system begins to deliver said soft, solid, sublimable particles.

19. A method as in claim 17, wherein the exit orifices are reciprocated along a path of reciprocation parallel to said path of glass sheet travel into said quenching position.

20. A method as in claim 19, including holding said exit orifices stationary as said glass sheet moves toward said quenching position, moving said exit orifices in a direction opposite the direction of glass sheet movement into said quenching position when said glass sheet arrives at said quenching position and continuing to move said exit orifices in a linear reciprocating path after said glass sheet stops at said quenching position to insure continuous relative motion between said exit orifices and said glass sheet during application of said tempering medium.

21. A method of tempering a glass sheet comprising heating said glass sheet to an elevated temperature range sufficient for tempering and moving said glass sheet in a given direction into a quenching position between a pair of sets of exit orifices while said exit orifices are stationary, and tempering medium is applied therethrough toward the opposite major surfaces of said glass sheet and, when the glass sheet decelerates as it approaches said quenching position, starting to reciprocate said exit orifices in unison with an initial stroke in the direction opposite said given direction and continuing to reciprocate said orifices after said glass sheet stops at said quenching position so as to insure continuous relative movement between the glass sheet and said exit orifices during both the entry of the glass sheet into said quenching position and its subsequent quenching at said quenching position.

22. A method as in claim 21, further including initially exposing said glass sheet to tempering medium having a relatively small heat capacity and later exposing said glass sheet to soft, solid sublimable particles of tempering medium having a greater heat capacity applied at a rate sufficient to impart a temper of at least 40,000 psi (2810 kilograms per square centimeter) while avoiding surface damage and disfiguration which results in optical distortion.

23. Apparatus for tempering a glass sheet comprising glass sheet heating means, a cooling station including a source of dry, pressurized air, means to store a sublimable material under pressure at a temperature sufficiently cold to store said sublimable material in a liquid state, a delivery system comprising an uninsulated portion containing dry air, a pair of opposite sets of exit orifices and means to selectively deliver said dry air under pressure to said exit orifices for delivery toward said glass sheet, means to convey said glass sheet from said heating means into a quenching position between said sets of exit orifices in said cooling station while delivering said pressurized air through said exit orifices, valve means to discontinue the application of dry air to said delivery system, means to selectively deliver said sublimable material through said delivery system including valve means constructed and arranged to control the delivery of said sublimable material to said uninsulated portion to purge said dry air from said delivery system through said exit orifices and then deliver said sublimable material initially in gaseous form mixed with said dry air in increasing concentrations of said sublimable material in the gaseous state and finally to deliver a mixture of said sublimable material in a mixture of gas and soft, solid, cold, sublimable particles of increasing concentration of said particles.

24. Apparatus as in claim 23, further including a valved common feed line including said uninsulated portion, a valved supply line connecting said storage means to said valved common feed line, a valved supply line connecting said pressurized dry air source to said common feed line and a valved vent pipe for said common feed line upstream of said uninsulated portion of said delivery system.

25. Apparatus as in claim 24, further including means to convey said glass sheet to a quenching position between said opposed sets of exit orifices within said cooling station, means to reciprocate said exit orifices in unison in response to control means actuated by entry of said glass sheet into said cooling station, and means for adjusting the phase of said reciprocating means to support said opposed sets of exit orifices at the downstream end of said path of reciprocation, whereby when said glass sheet decelerates to a stop at said quenching position, said reciprocating means starts to operate to move said exit orifices in an upstream direction to insure continuous relative movement between said glass sheet and said exit orifices during both the entry of said glass sheet into said quenching position and its subsequent quenching at said quenching station.

26. Apparatus for tempering a glass sheet comprising glass sheet heating means, a cooling station and means to convey said glass sheet to a quenching position between said opposed sets of exit orifices within said cooling station, means to reciprocate said exit orifices in unison in response to control means actuated by entry of said glass sheet into said cooling station, and means for adjusting the phase of said reciprocating means to support said opposed sets of exit orifices at the downstream end of said path of reciprocation, whereby when said glass sheet decelerates to a stop at said quenching position, said reciprocating means starts to operate to move said exit orifices in an upstream direction to insure continuous relative movement between said glass sheet and said exit orifices during both the entry of said glass sheet into said quenching position and its subsequent quenching at said quenching position.

27. Apparatus as in claim 26, wherein said conveying means defines a horizontal path, further including an elongated slot cooler between said heating means and said cooling station, said elongated slot cooler comprising a pair of opposed elongated slots facing said path from opposite sides thereof and having a vertical length at last equal to the vertical dimension of said glass sheet, and means to deliver streams of tempering medium through said elongated slots in opposite directions toward said path when said glass sheet is conveyed from said heating means to said cooling station.

28. Apparatus as in claim 26 wherein said conveying means defines a horizontal path, further including cooling medium supply means comprising opposed sets of nozzles having openings facing an extension of said horizontal path beyond said cooling station and means to deliver cooling medium to said nozzles for discharge through said openings toward said glass sheet.

29. Apparatus as in claim 26, wherein said conveying means defines a horizontal path, further including an elongated slot cooler intermediate said heating means and said cooling station, said elongated slot cooler comprising a pair of opposed elongated slots having a vertical length at least equal to the vertical dimension of said glass sheet, and means to deliver streams of tempering medium through said elongated slots in opposite directions toward said path when said glass sheet is conveyed from said heating means to said cooling station, and a cooling medium supply means comprising opposed sets of nozzles having openings facing an extension of said horizontal path beyond said cooling station and means to deliver cooling medium to said nozzles for discharge through said openings toward said glass sheet.

* * * * *

UNITED STATES PATENT AND TRADEMARK OFFICE
CERTIFICATE OF CORRECTION

PATENT NO. : 4,445,921

DATED : May 1, 1984

INVENTOR(S) : Terry A. Bennett, Herbert W. Eilenfeld and Dewitt W. Lampman

It is certified that error appears in the above-identified patent and that said Letters Patent is hereby corrected as shown below:

Column 13, line 25, "shpaed" should be --shaped--.

Column 17, line 15, "last" should be --least--.

Signed and Sealed this

Twenty-sixth Day of March 1985

[SEAL]

Attest:

DONALD J. QUIGG

Attesting Officer Acting Commissioner of Patents and Trademarks